United States Patent [19]
Furuya

[11] Patent Number: 5,692,843
[45] Date of Patent: Dec. 2, 1997

[54] PRINTING CONTROL METHOD AND APPARATUS USING THE SAME METHOD

[75] Inventor: Masami Furuya, Ebina, Japan

[73] Assignee: Fuji Xerox Co., Ltd., Tokyo, Japan

[21] Appl. No.: 607,572

[22] Filed: Feb. 27, 1996

[30] Foreign Application Priority Data

Mar. 6, 1995 [JP] Japan ................... 7-045131

[51] Int. Cl.⁶ ........................ B41J 2/21
[52] U.S. Cl. ................... 400/120.02; 347/43
[58] Field of Search ............... 400/120.02, 120.04, 400/124.08, 124.09, 240, 240.3, 240.4; 347/9, 12, 43

[56] References Cited

U.S. PATENT DOCUMENTS

| | | | |
|---|---|---|---|
| 5,248,209 | 9/1993 | Isobe | 400/120.04 |
| 5,455,610 | 10/1995 | Harrington | 347/43 |

FOREIGN PATENT DOCUMENTS

| | | | |
|---|---|---|---|
| 64-7536 | 1/1989 | Japan | 400/120.02 |
| 2-233275 | 9/1990 | Japan | 400/120.02 |
| 3-207665 | 9/1991 | Japan | 400/120.02 |
| 7-237346 | 9/1995 | Japan | 400/120.02 |

*Primary Examiner*—Edgar S. Burr
*Assistant Examiner*—Steven S. Kelley
*Attorney, Agent, or Firm*—Oliff & Berridge

[57] ABSTRACT

In a black mode, image data for each color corresponding to the printing width of a black head are pre-read. If there is no color data, all the pre-read black data are printed. If there is some color data, black data are printed up to data just before the color data and then the mode is switched over to a color mode. In the color mode, image data corresponding to the printing width of each color in a color head are pre-read. If there is no color data, data are further pre-read up to data corresponding to the printing width of the black head. If there is further no color data, all data up to the current position of the head are printed in the color mode and then the mode is switched over to the black mode. Otherwise, printing by the printing width of each color in the color mode is continued.

26 Claims, 7 Drawing Sheets

PRINTING CONTROL METHOD AND APPARATUS USING THE SAME METHOD

BACKGROUND OF THE INVENTION

The present invention relates to a printing control method in a serial printer for performing recording by using a color head and a black head and an apparatus using the same method.

As a configuration of recording heads in a serial printer, there has been developed a two-head type printer in which a color head and a black head each of which has a plurality of printing elements arranged in a subsidiary scanning direction are arranged side by side in a main scanning direction on a carriage. In this occasion, in use, the printing element array in the color head is divided into printing element groups of colors different from each other. In such a configuration of heads, color printing is performed by the width of one color arranged in the color head. Further, in the case where printing is to be performed only in black, printing is performed by the width of the black head to thereby make high-speed printing possible. As a printing control technique using heads configured as described above, there is, for example, a technique described in Japanese Patent Unexamined Publication No. Hei-7-237346.

A printing control method in which black recording is divisionally performed by a plurality of times of scanning to thereby obtain a high-quality image is described in Japanese Patent Unexamined Publication No. Hei. 7-237346. As such a technique in which an image is printed by such a plurality of times of scanning, for example, a similar technique which is however different in the configuration of heads is described in Japanese Patent Unexamined Publication No. Hei. 3-207665, etc.

In the above Japanese Patent Unexamined Publication No. Hei. 7-237346, there is a further description that when image data corresponding to the width of the black printing element array are read out, printing is performed only by the black head in this scanning operation to achieve high-speed printing if there is no color data in the read-out image data. There is still a room to improve more greatly because printing cannot be performed only by the black head even in the case where a black-only printing region of a smaller width than the width of the black printing element array is present.

As another printing control technique, for example, a printing control technique in which bidirectional print scanning is performed and then switched over to unidirectional scanning in portions of joints of an image is described, for example, in Japanese Patent Unexamined Publication No. Hei-2-233275. Further, a technique in which paper feeding is performed to carry out a skipping operation in a line having no image data to be printed is described in Japanese Utility Model Unexamined Publication No. Sho. 64-7536.

SUMMARY OF THE INVENTION

An object of the present invention is to provide a printing control method and an apparatus using the same method in which an image having black printing regions and color printing regions mixed are printed at a high speed in a serial printer in which a color head for printing in a plurality of colors and a black head for printing in black are arranged side by side.

According to the invention stated in aspect 1, provided is a printing control method and an apparatus for a serial printer having a color head and a black head arranged in a main scanning direction on a carriage, each of the color head and the black head having an array of printing elements arranged in a subsidiary scanning direction, the array of printing elements in the color head being divided into groups of printing elements by every color, the height of the used printing element array in the black head used for printing being higher than the height of the printing element array in any of the color groups in the color head, the color head and the black head being driven on the basis of image data read from an image memory to thereby perform recording, characterized in that the method has a recording mode in which: image data on lines the number of which corresponds to the used printing element array in the black head are read from the image memory; when color data are included in the read data, the number N1 of lines in a region of from the leading line in the read image data to a line just before the presence of the first color data is detected and compared with the number N2 of lines corresponding to the height of each of the groups in the color head; when N1>N2, the image data of N1 lines from the leading line of the read image data are printed by driving the black head; and when N1≦N2, the image data of N2 lines from the leading line of the read image data are printed by driving the color head and the black head.

According to the invention stated in aspect 2, provided is a printing control method and an apparatus for a serial printer having a color head and a black head arranged in a main scanning direction on a carriage, each of the color head and the black head having an array of printing elements arranged in a subsidiary scanning direction, the array of printing elements in the color head being divided into groups of printing elements by every color, the height of the used printing element array in the black head used for printing being higher than the height of the printing element array in any of the color groups in the color head, the color head and the black head being driven on the basis of image data read from an image memory to thereby perform recording, characterized in that the method has a recording mode in which: image data on lines the number of which corresponds to the used printing element array in the black head are read from the image memory; when color data are included in the read data, image data are printed by driving the black head by the number of lines in a region of from the leading line in the read image data to a line just before the presence of the first color data; and when no color data is included, image data in all the read lines are printed by driving the black head.

According to the invention stated in aspect 3, provided is a printing control method and an apparatus for a serial printer having a color head and a black head arranged in a main scanning direction on a carriage, each of the color head and the black head having an array of printing elements arranged in a subsidiary scanning direction, the array of printing elements in the color head being divided into groups of printing elements by every color, the height of the used printing element array in the black head used for printing being higher than the height of the printing element array in any of the color groups in the color head, the color head and the black head being driven on the basis of image data read from an image memory to thereby perform recording, characterized in that the method has a recording mode in which: image data on lines the number of which corresponds to the printing element array of one group in the color head are read from the image memory; when no color data are included in the read image data, image data are further read out up to the number of lines corresponding to the used printing element array in the black head; when no color data are included in the read image data, image data up to a line prior to the leading line in the read image data are printed by the number of lines not larger than the number of lines corresponding to the printing element array of one group in the color head by driving the color head and the black head and then the mode is switched over to a recording mode in which the image data are printed by driving only the black head; and otherwise, image data are printed by the number of lines not larger than the number of lines corresponding to the printing element array of one group in the color head.

According to the invention stated in aspect 4, the printing control method and an apparatus according to any one of aspects 1 through 3 is characterized in that the color head has at least one group of printing elements for printing cyan; and when the color head and the black head are used for performing printing, black printing is performed by using a printing element located in a position corresponding to a cyan printing element in the color head.

According to the invention stated in aspect 5, the printing control method and an apparatus according to any one of aspects 1 through 4 is characterized in that when the color head is driven to perform printing, image data in a plurality of lines corresponding to the arrangement of each color group in the color head are read from the image memory.

According to the invention stated in aspect 6, the printing control method and an apparatus according to any one of aspects 1 through 5 is characterized in that when image data are read from the image memory, an operation of skipping is performed by the number of lines based on the number of lines from the leading line of the read image data to a line just before the line in which the black data or the color data are present, and then image data are read again from the image memory.

According to the invention stated in aspect 7, the printing control method and an apparatus according to aspect 3 is characterized in that when image data for printing are read from the image memory, image data are read for every image region to be printed for each color; the number N3 of lines in a region of from the leading line of the read image data to a line just before the line containing the first black data and the number N4 of lines in a region of from the leading line of the read image data to a line just before the line containing the first color data are detected; the minimum number N5 of lines is detected between the number N3 of lines and the number N4 of lines; the recording medium is fed by the number N5 of lines; and image data for each color are read from a line forwarding by the number N5 of lines from the leading line of the read image data.

According to the invention described in aspect 1, image data in lines the number of which corresponds to the used printing element array in the black head are pre-read from the image memory, and the number N1 of lines in a region of from the leading line of the image data to a line just before the line having the first color data is detected. If there is no color data, the number of lines corresponding to the used printing element array is set to N1. The number N1 of lines is compared with the number N2 of lines corresponding to the height of one group in the color head. When N1>N2, image data of N1 lines from the leading line of the read image data are printed by driving the black head. Because, as a result, image data on the lines the number of which is larger than the number N2 of lines can be printed by scanning once, high-speed printing can be performed compared with the case where scanning has to be made once for every N2 of lines.

When N1≦N2, image data of N2 lines are printed by driving the color head and the black head because the region of printing by the N2 lines at the time of color printing is wider than the region of printing by the N1 lines at the time of black printing. In this manner, the printing speed can be kept not so as to be reduced.

In the invention described in aspect 2, image data are printed by the number of lines from the leading line to a line just before the line having the first color data, and, further, when there is no color data, image data in all the read lines are printed by driving the black head. As a result, in the case where the number of lines containing no color data is larger than the number N2 of lines, image data in lines the number of which is larger than the number N2 of lines can be printed by scanning once. Accordingly, high-speed printing can be made compared with the case where scanning is performed once for every N2 lines. Furthermore, a control process can be simplified.

In the invention described in aspect 3, when printing is performed by driving the color head and the black head, image data on lines the number of which corresponds to the printing element array of one group in the color head are pre-read from the image memory so that printing is performed while the color head and the black head are driven continuously when there is color data in the pre-read image data. When there is no color data in the pre-read image data, image data are further pre-read up to the number of lines corresponding to the used printing element array in the black head. When there is no color data in the further pre-read image data, image data up to a line just before the leading line of the pre-read image data are printed by driving the color head and the black head and then the mode is switched over to a recording mode in which printing is performed only by driving the black head. As a result, image data on lines containing only black data continued to a region containing the color data can be printed at a high speed by wide scanning. In this occasion, color data which are not yet printed when pre-read can be printed without any obstacle.

When control is made so that black data are printed by the black head in the same position as the position where cyan data are printed by the color head in the manner as in the invention described in aspect 4 in the case where printing is performed by using both the color head and the black head, blur is made inconspicuous so that a high-quality image can be obtained.

In the color head used in the present invention, regions to be printed by the groups vary in accordance with the groups. According to the invention described in aspect 5, therefore, image data in a plurality of lines corresponding to the arrangement of the respective color groups in the color head are read from the image memory when printing is made by driving the color head. As a result, printing can be made in regions which vary in accordance with the respective groups.

According to the invention described in aspect 6, when a line containing no data to be printed is detected in the case where image data are pre-read from the image memory, an operation of skipping lines is carried out by the number of lines based on the number of lines from the detected line up to a line just before the line containing black or color data. As a result, the unnecessary printing operation can be reduced so that higher-speed printing can be achieved. Incidentally, with respect to skipping of a line having no data to be printed and continued to color data, the skipping operation may be carried out after image data up to a line just before the line having no data are printed by driving the color head and the black head like the invention described in aspect 3. Further, also in the case where there is no printing data in the printing region of each color in a mode in which printing is made by driving the color head and the black head, configuration may be made so that the skipping operation is carried out.

According to the invention described in aspect 7, even in a period in which color data is printed in such a manner as described in aspect 3, the number of lines containing no data to be printed in the printing region of each color is detected so that the skipping operation can be made by feeding the recording medium by the minimum number of lines in the detected numbers of lines. As a result, high-speed printing can be made while reducing unnecessary print scanning even in the period in which color data are printed.

DETAILED DESCRIPTION OF THE PREFERRED EMBODIMENTS

Figure 1:
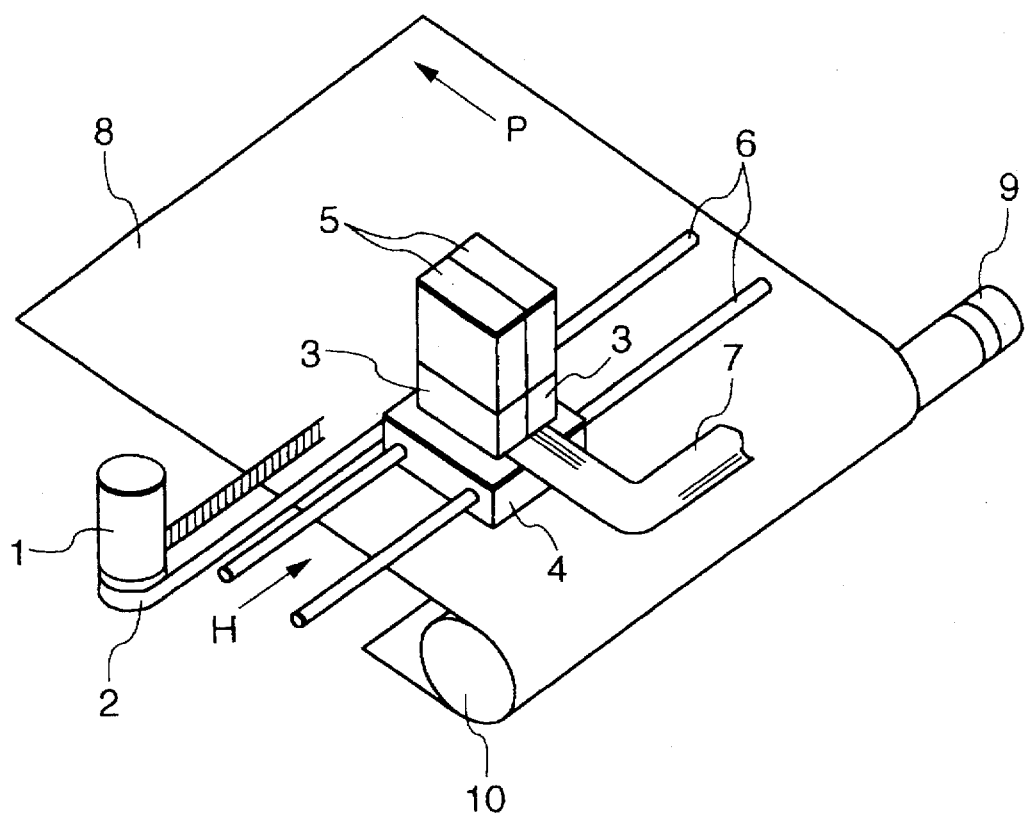
FIG. 1 is a schematic configuration diagram showing an example of a recording apparatus to which a printing control method according to the present invention is applied.

FIG. 1 is a schematic configuration diagram showing an example of a recording apparatus to which a printing control method and an apparatus according to the present invention is applied. In FIG. 1, the reference numeral 1 designates a carriage driving motor; 2, a timing belt; 3, recording heads; 4, a carriage; 5, ink tanks; 6, carriage guides; 7, a cable; 8, a sheet of recording paper; 9, a paper-feed motor; and 10, a feed roll. In FIG. 1, an ink-jet type recording apparatus is shown as an example of the serial printer.

The carriage 4 which mounts the recording heads 3 and slides along the carriage guides 6 so as to move back and forth in a main scanning direction of the arrow H shown in FIG. 1. The movement of the carriage 4 is performed by the timing belt 2 driven by the carriage driving motor 1. Two heads shown as the recording heads 3 in this example are arranged in the direction of the movement of the carriage 4. One head serves to record black and the other head serves to record a plurality of colors, for example, cyan, magenta and yellow, other than black. The cable 7 is introduced into the recording heads 3 in order to perform electrical power supply to heaters within the recording heads 3, signal transmission to a driving circuit, and so on. Further, the ink tanks 5 are mounted onto the recording heads 3 respectively in order to supply ink of the respective colors. A plurality of nozzles are arranged in each of the recording heads 3 so that supplied ink is ejected from the nozzles to perform recording on the sheet of recording paper 8. The sheet of recording paper 8 is driven in the direction of the arrow P shown in FIG. 1 by the feed roll 10 which is driven to rotate by the paper-feed motor 9, so that subsidiary scanning is performed.

Figure 2:
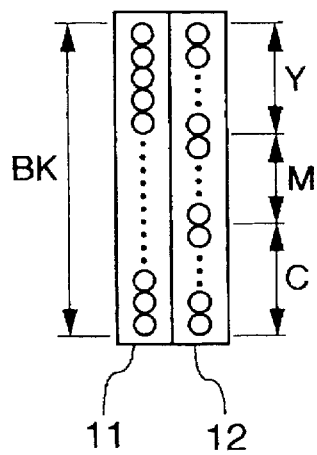
FIG. 2 is a schematic diagram showing an example of recording heads used in the printing control method according to the present invention.

FIG. 2 is a schematic diagram showing an example of the recording heads used in the printing control method and an apparatus according to the present invention. In FIG. 2, the reference numeral 11 designates a black recording head; and 12, a color recording head. For example, in an ink-jet type, nozzles are arranged in each of the recording heads vertically in FIG. 2. In the black recording head 11, recording is performed by using all or part of the nozzles arranged therein.

In the color recording head 12, the nozzles arranged therein are classified into groups in accordance with the number of colors to be used. In FIG. 2, there is shown the case where three ink colors, that is, cyan, magenta and yellow, are used. Nozzles for ejecting the respective colors of ink are arranged linearly. In FIG. 2, the reference character BK designates black; C, cyan; M, magenta; and Y, yellow. All the nozzles provided in the color recording head 12 may be classified into groups or nozzles not to be used may be provided. Such nozzles not to be used may be arranged between the groups so that colors can be prevented from mixing on a surface of the head, etc. Not only the order of the arrangement of colors but also colors to be used and the number of colors may be changed suitably.

Figure 3:
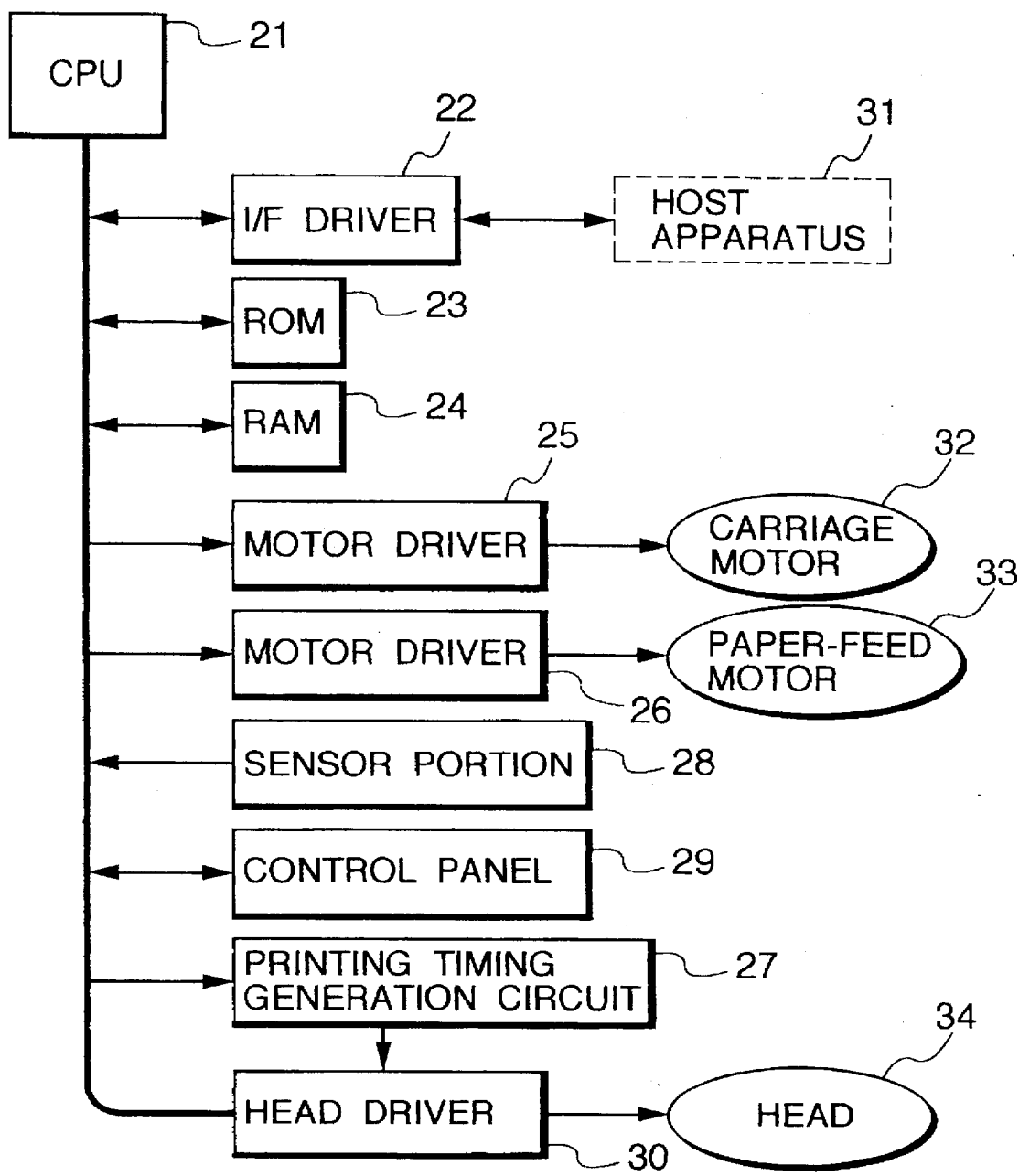
FIG. 3 is a block diagram showing an example of a control system for carrying out the printing control method according to the present invention.

FIG. 3 is a block diagram showing an example of a control system for carrying out the printing control method according to the present invention. In FIG. 3, the reference numeral 21 designates a CPU; 22, an I/F driver; 23, an ROM; 24, an RAM; 25 and 26, motor drivers; 27, a printing timing generation circuit; 28, a sensor portion; 29, a control panel; 30, a head driver; 31, a host apparatus; 32, a carriage motor; 33, a paper-feed motor; and 34, a head. The CPU 21 controls respective parts of the recording apparatus while using the RAM 24 in accordance with control procedures and data stored in the ROM 23, data detected by the sensor portion 28 containing a paper detection sensor, or the like. Further, the CPU 21 which is connected to the host apparatus 31 such as a computer, or the like, through the interface 22, stores recording data such as image data, or the like, from the host apparatus 31 into the RAM 24 and controls a recording operation while decoding instruction signals such as commands, or the like, and recording information signals given by the host apparatus 31. The RAM 24 contains a work area for the CPU 21 and functions also as an image memory in which image data to be recorded are developed into dots and stored while classified by colors. The motor drivers 25 and 26 and the head driver 30 control the carriage motor 32, the paper-feed motor 33 and the head 34 respectively in accordance with the instruction of the CPU 21. The printing timing generation circuit 27 generates a timing signal for ejecting ink from the head 34 and supplies the generated timing signal to the head driver 30, in accordance with the instruction from the CPU 21. The sensor portion 28 detects temperature, ink quantity, absence of paper, and so on, in respective parts of the apparatus and transmits the result of detection to the CPU 21. Not only the state of the apparatus is displayed on the control panel 29 but also an instruction is given by a user through the control panel 29.

Figure 4:
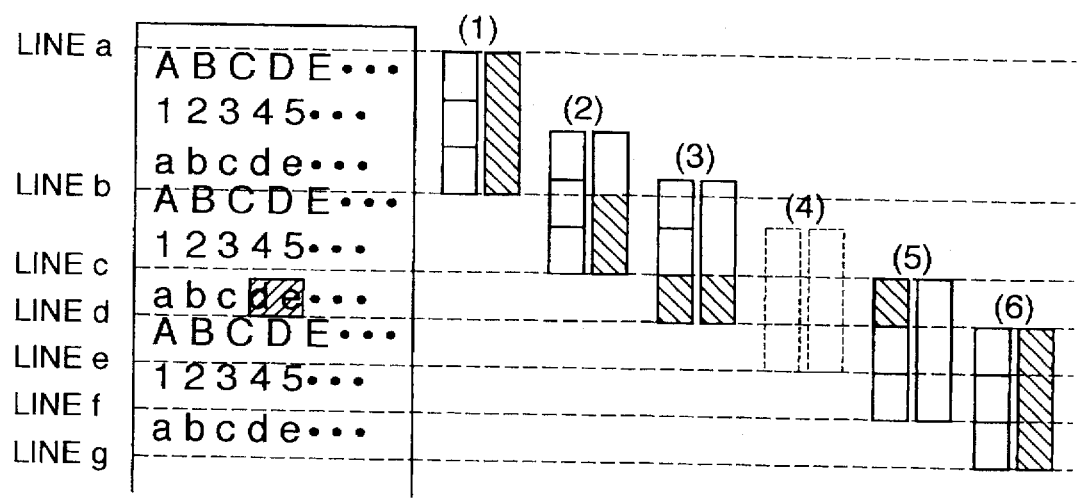
FIG. 4 is an operational explanatory diagram showing a first embodiment of the printing control method according to the present invention.

FIG. 4 is an operational explanatory diagram showing a first embodiment of the printing control method according to the present invention. In the following description, it is assumed that the color head prints dots equally in numbers for the three colors of cyan, magenta and yellow and that the black head prints dots three times as large in number as the number of dots for each color. Further, in this embodiment, two printing modes, that is, a black mode and a color mode, are provided so that printing is performed while the two printing modes are switched from one another. In the black mode, the black head alone is used so that all dots are used for performing printing. In the color mode, both the black and color heads are used for performing printing, that is, the black head uses only dots equal in number to dots for each color in the color head. The color head uses the number of dots for each color. In the case shown in FIG. 4, it is assumed that the black head in the color mode performs printing on the same region as cyan. It is further assumed that the current position of the heads indicates the lower end of the printing region of the heads and that the upper end of recording paper is initially located in the current position.

The operation in the black mode will be described first. In the black mode, image data in each color are pre-read. If there is no data to be printed in the current position at this time, paper feeding is performed up to a line just before a line in which some data to be printed appears. Then, a judgment is made as to whether the data to be printed is color data or black data. When the data is color data, the mode is switched over to the color mode.

If there is no color data when image data of each color are pre-read by the printing width of the black head, the pre-read black data are printed in the printing width of the black head.

If there is some color data in the printing width of the black head, black data up to data just before the color data are printed and then the mode is switched over to the color mode.

Next, the operation in the color mode will be described below. In the color mode, image data corresponding to the printing width of each color in the color head are pre-read. If color data are contained in this occasion, printing in the color mode is continued. The configuration may be designed so that when some lines having no printing data exist from the leading of each printing region, such lines may be skipped.

If there is no color data as a result of the pre-reading of data corresponding to the printing width of each color in the color head, data are further pre-read up to data corresponding to the printing width of the black head. If there is no color data in this occasion, all data up to the current position of the head are printed in the color mode and then the mode is switched over to the black mode to perform printing in the black mode.

If there is some color data as a result of the pre-reading of data corresponding to the printing width of the black head, the color mode is continued so that printing by the printing width of each color in the color head is continued.

The aforementioned operations of the black mode and the color mode will be described specifically on the basis of the embodiment shown in FIG. 4. In FIG. 4, the line "ABCDE . . . ", the line "12345 . . . " and the line "abcde . . . " are printed repeatedly. These lines are printed in black. A green rectangle is printed in a portion "de" of the character string "abcde . . . " on the sixth line. For the sake of convenience of drawing, the portion to be printed in green is shown by hatching in FIG. 4. It is further assumed that the region to be printed in green is contained in a region of the printing width of each color in the color head, that is, in a region of from the line c to the line just before the line d. Printing in green is performed by superimposing cyan and yellow on each other.

It is assumed that the lower end of the head is initially positioned in the upper end of a sheet of recording paper. First, image data are pre-read. Because there is some blank in the upper end portion of image data, the sheet of recording paper is fed from this portion so that the current position of the recording head is adjusted to the upper end of the first line "ABCDE . . . ", that is, to the line a. Because the character string "ABCDE . . . " are printed in black in this condition, the selected mode is a black mode.

In the black mode, image data of each color corresponding to the printing width of the black head are pre-read. In this occasion, image data in a region of from the line a to a line just before the line b are pre-read. There is no color data but black data in this region. Accordingly, as represented by (1) in FIG. 4, the pre-read image data in the region of from the line a to a line just before the line b are printed in the printing width of the black head by using the black head.

After printing is performed as represented by (1) in FIG. 4, the black mode is continued. Accordingly, image data of each color in a region corresponding to the printing width of the black head are further pre-read. In this occasion, there are some color data in the line c. Accordingly, black data in a region of from the line b to a line just before the line c having color data are printed by using the black head as represented by (2) in FIG. 4. Then, the mode is switched over to a color mode.

In the color mode, image data corresponding to the printing width of each color in the color head are pre-read first. In this occasion, image data in a region of from the line c to a line just before the line d are pre-read. Because color data of cyan and yellow are present in this region, printing is performed by the printing width of each color in the color head. First, as represented by (3) in FIG. 4, data in a region of from the line c to a line just before the line d are printed by cyan of the color head and the black head.

Then, image data in a region of from the line d to a line just before the line e, corresponding to the printing width of each color in the color head, are pre-read. There is no color data contained in this region. Accordingly, data are further pre-read by the printing width of the black head. That is, data in a region of from the line e to a line just before the line g are further pre-read. As a result, pre-reading of data corresponding to the printing width of the black head is performed in a region of from the line d to a line just before the line g. There is no color data in this region. In this case, all data in the current head position, that is, up to a line just before the line d are printed in the color mode. That is, not-printed image data of yellow remain in a region of from the line c to a line just before the line d. The not-printed image data are to be printed in the color mode.

First, from the state (3) in FIG. 4, image data in a region to be printed next are checked for each color. That is, image data in a region before a line just before the line c are checked for yellow, and image data in a region of from the line c to a line just before the line d are checked for magenta. In this occasion, a region in which printing in cyan and black can be made is out of range because this region appears after the line d. In this occasion, there is no image data to be printed in yellow and magenta. Accordingly, print scanning in the position of (4) in FIG. 4 is skipped. This skipping operation is performed until some image data to be printed appears in any region to be printed in each color. In this example, image data to be printed in yellow appear in the line c. Also in this case, black data which will appear after the line d are not referred to. As represented by (5) in FIG. 4, data in a region of from the line c to a line just before the line d are printed in yellow. As a result, printing of remaining data in the region to a line just before the line d is finished. Thereafter, the mode is switched over to the black mode.

In the black mode, data corresponding to the printing width of the black head are printed by the black head as represented by (6) in FIG. 4, because there is no color data as a result of pre-reading of data just before the printing width of the black head.

Because printing in a portion in which data can be printed only in black is performed in this manner by utilizing the wide printing width of the black head as effectively as possible, high-speed printing can be made. For example, even in the case where there is any color data in the printing width of the black head as represented by (2) in FIG. 4, black data up to data just before the color data are printed by the black head. Accordingly, high-speed printing can be made compared with the conventional case where printing is made in the color mode when there is any color data in the printing width of the black head. Furthermore, because intervals between respective print scans are shortened by printing black data in a printing width as wide as possible in this manner, a high-quality print image can be obtained. Furthermore, higher-speed printing is carried out by skipping of lines having no printing data, skipping in the state of (4) in FIG. 4, or the like.

In the aforementioned black mode, printing is performed by the black head so long as the portion in which printing can be made only in black continues. Therefore, when the remainder of the portion in which printing can be made only in black is short, scanning is required once for printing of the small portion. To avoid this, configuration may be made so that printing is performed after the mode is switched from the black mode to the color mode at a point of time when the number of lines which can be printed only in black is not larger than the number of lines corresponding to the printing width of each color in the color head. In this configuration, efficient printing can be made because print scanning is not made when the number of lines is smaller than the number of lines corresponding to the printing width of each color in the color head.

In the case of the color mode in the aforementioned example, printing in black and printing in cyan are performed simultaneously. Generally, when printing is made while different colors are superimposed on each other simultaneously, there is a tendency that blur is produced between the colors. When printing in black and printing in cyan are made simultaneously, the blur is however inconspicuous. Accordingly, image quality can be improved by printing in black and in cyan simultaneously. It is a matter of course that configuration may be made so that printing in black is made simultaneously with printing in magenta or yellow if printing can be made in the condition in which there is no blur produced.

Although unidirectional printing is preferred with respect to the direction of printing from the point of view of image quality, bidirectional printing may be made if it is allowed from the points of view of mechanical accuracy, image quality, and so on.

Figure 5:
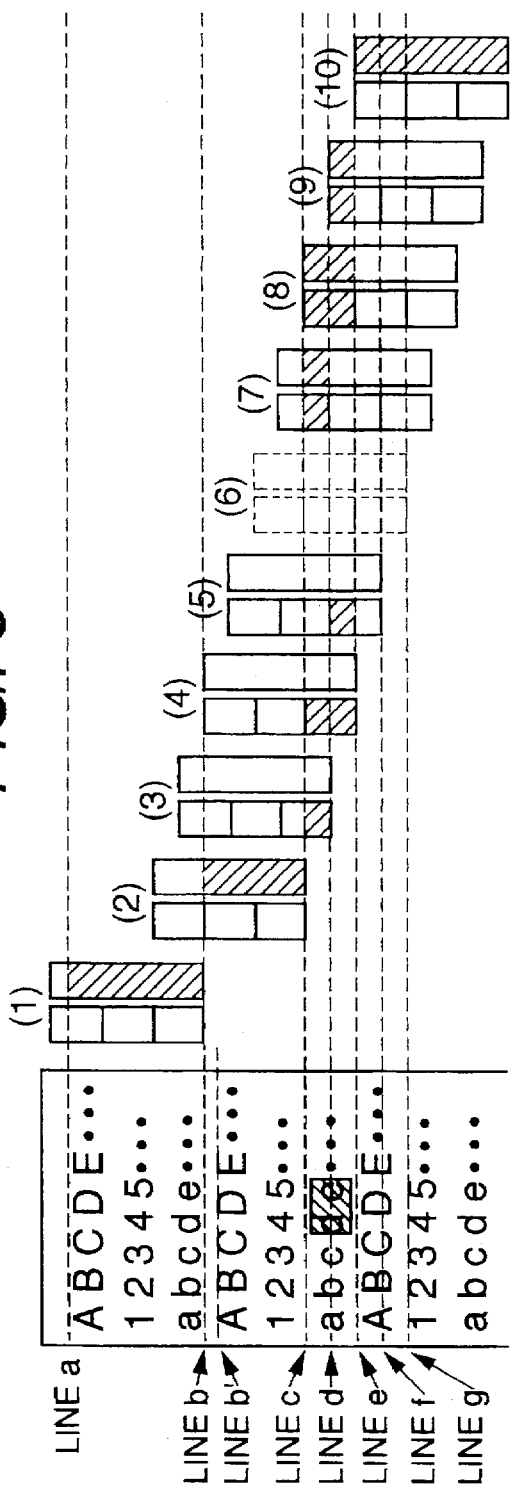
FIG. 5 is an operational explanatory diagram showing a second embodiment of the printing control method according to the present invention.

FIG. 5 is an operational explanatory view showing a second embodiment of the printing control method according to the present invention. Also in the second embodiment, it is assumed that the color head serves to print dots equally in number in the three colors of cyan, magenta and yellow respectively and that the black head has dots the number of which is three times as large as the number of dots in each color. Further, two printing modes, that is, a black mode and a color mode, are provided so that printing is performed while the two printing modes are switched over from one another. In the example shown in FIG. 5, it is assumed that the black head in the color mode performs printing in the same region as in yellow. It is further assume that the current position of each head indicates the lower end of the printing region of the head, and that the upper end of a sheet of printing paper is initially located in the current position.

Figures 6A, 6B, 6C:
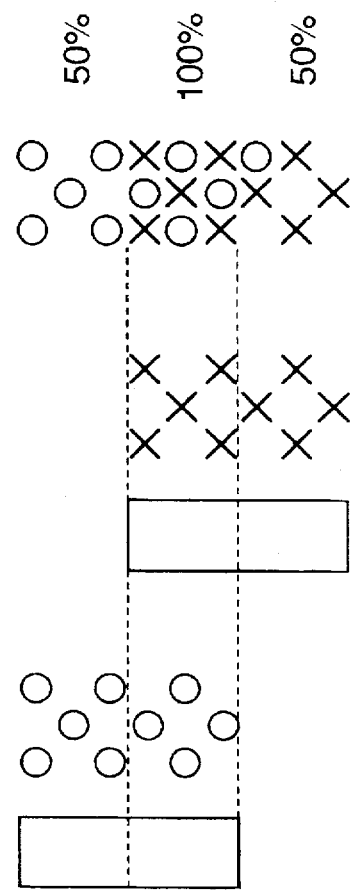
FIGS. 6(A) to 6(C) are diagrams for explaining an example of a printing image to be formed by performing print scanning twice.

In the second embodiment, printing is performed by 50% by carrying out print scanning once. Printing is performed by 100% by carrying out print scanning twice. Further, paper feeding by half of the printing width of single color in the color head is performed between the first print scanning and the second print scanning. FIG. 6 is an explanatory view showing an example of a printing image to be formed by carrying out print scanning twice. In FIG. 6, only one color and several dots are shown. First, in print scanning shown in the diagram FIG. 6(A), printing data obtained by thinning image data by 50% are generated and printing is performed. After printing, paper feeding by half of the printing width of each color in the color head is performed and, in print scanning shown in the diagram FIG. 6(B), printing data of a pattern for interpolating the dots printed in the diagram FIG. 6(A) are generated and printing is performed. As a result, printing is performed by 100%. By such print scanning, mismatches in joints between respective print scans caused by a paper feeding error and mismatches in dot positions caused by the variations in direction of nozzles are made inconspicuous and adjacent dots printed simultaneously are reduced in number to reduce bleeding to thereby improve the image quality.

Furthermore, in this embodiment, at the time of the black mode, a printing region is divided by a line in which there is no image data to be printed. By this, joints of print scans do not come into the printing image as possible to thereby improve the quality of the printing image. Further, in the black mode, in the case where the printing region is divided by a line containing no image data to be printed, bidirectional printing is performed to improve the printing speed more greatly.

The operation in the black mode will be described. First, image data are pre-read up to data corresponding to the printing width of the black head. If there is no color data in the pre-read image data, printing is performed up to a break line of the nearest black data to the printing width of the black head. If black data are present all over the printing width of the black head in this occasion, printing is performed by the printing width of the black head. In this case, the mode is switched to unidirectional printing mode, and unidirectional printing is performed up to the break line of black data. Thus, mismatches in joints of print scans are reduced.

If there is some color data in the pre-read image data, black data up to a line just before the line in which the color data is present are printed by using the black data. Thereafter, the mode is switched over to the color mode.

Next, the color mode will be described. First, image data corresponding to the printing width of each color in the color head are pre-read. If there is some color data in the pre-read image data, printing in the color mode is continued. With respect to printing in the color mode, as described above, 50% printing is performed while paper feeding is performed by half of the printing width of each color in the color head.

If there is no color data in the image data corresponding to the printing width of each color in the color head, image data are further pre-read up to data corresponding to the printing width of the black head. If there is some color data in the pre-read image data, printing in the color mode is continued. If there is no color data in the pre-read image data corresponding to the printing width of the black head, all data up to the current position are first printed in the color mode and then the mode is switched over to the black mode.

The aforementioned operations of the black mode and the color mode will be described specifically on the basis of the example shown in FIG. 5. The image to be printed is the same as shown in FIG. 4. Recording paper is fed so that the current position is adjusted to come to the line a. In the black mode, image data corresponding to the printing width of the black head are pre-read. In this occasion, image data in a region of from the line a to a line just before the line b' are pre-read. Here, a break line of black data nearest to the printing width of the black head is detected. In this occasion, the line b is detected. Then, black data in a region of from the line a to a line just before the line b are printed by the black head by performing scanning once. The state in this occasion is represented by (1) in FIG. 5. After printing, paper feeding by space between lines may be performed.

Then, image data corresponding to the printing width of the black head are further pre-read. In this occasion, color data are present in the line c. Accordingly, as represented by (2) in FIG. 5, black data in a region of from the line b to a line just before the line c are printed by using the black head. This printing can be achieved by printing in a direction reverse to the direction of print scanning represented by (1) in FIG. 5. Then, the mode is switched over to the color mode.

After the mode is switched over to the color mode, image data corresponding to the printing width of each color in the color head are first pre-read. In this occasion, printing in the color mode is performed because cyan data and yellow data are present in a region of from the line c to a line just before the line e.

In the color mode, image data corresponding to each color having a width half as large as the printing width of each color in the color head are read out. In this occasion, cyan data in a region of from the line c to a line just before the line d are read out. Then, 50% printing is performed in accordance with the first pattern as represented by (3) in FIG. 5.

Then, paper is fed by half of the printing width of each color in the color head. Because color data are detected by pre-reading the printing width of each color in the color head even in this state, printing in the color mode is continued as it is.

Then, cyan data in a region of from the line c to a line just before the line e are read out. In other colors, there is no data to be printed. Then, as represented by (4) in FIG. 5, 50% printing is performed in accordance with the second pattern for interpolating the first pattern. As a result, printing of cyan data is performed by 100% because print scanning for lines in a region of from the line c to a line just before the line d is performed half by half twice. At this point of time, lines in a range of from the line d to a line just before the line e are in a state in which cyan data are printed by 50% on the basis of the second pattern.

Then, paper is fed by half of the printing width of each color in the color head. If pre-reading of image data corresponding to the printing width of each color in the color head is performed at this point of time, there is no color data in the pre-read image data. Therefore, pre-reading of image data is further performed up to the printing width of the black head. In this occasion, there is no color data in the pre-read image data. In this case, image data up to a line just before the line e which is the current position are printed in the color mode and then the mode is switched over to the black mode.

With respect to printing in the color mode before the mode is switched over to the black mode, first, cyan data in a region of from the line d to a line just before the line e are printed by 50% on the basis of the first pattern as represented by (5) in FIG. 5. As a result, cyan data in a region of from the line d to a line just before the line e are printed by 100%.

Further, with respect to lines in a region of from the line c to a line just before the line e, printing in the color mode is continued because not-printed yellow data and not-printed black data remain therein. If image data in a printing region for each color are checked after paper is fed by half of the printing width of each color in the color head, there is no image data to be printed. Accordingly, print scanning as represented by (6) in FIG. 5 is not performed but paper feeding is performed. This control will be described later. Then, as represented by (7) to (9) in FIG. 5, printing is performed 50% by 50% in the same manner as in (3) to (5) in FIG. 5, so that yellow data are printed in a region of from the line c to a line just before the line e. In this occasion, black data are also printed simultaneously with yellow data.

When printing of all image data in a range to a line just before the line e is finished in this manner, the mode is switched over to the black mode. Then, image data corresponding to the printing width of the black head are pre-read. Because there is no color data, a break line of image data nearest to the printing width of the black head is detected as represented by (10) in FIG. 5, so that black data in a region of from the line e to a line just before the detected break line are recorded by the black head.

As described above, in this embodiment, even in a recording apparatus having a color mode in which 50% print scanning is performed twice, printing only in a region of black data is performed by utilizing the large printing width of the black head to thereby achieve high-speed printing and, furthermore, bidirectional printing is performed by dividing the region by the break line of black data to thereby make it possible to achieve higher-speed and higher-quality printing.

Although this embodiment has shown the case where printing of black data in the color mode is performed simultaneously with printing of yellow, the present invention is not limited thereto. The configuration may be designed so that printing of black data is performed simultaneously with printing of cyan data as described above in the first embodiment or printing of black data is performed simultaneously with printing of magenta data. Particularly, by printing black data simultaneously with cyan data as in the first embodiment, blur can be made inconspicuous so that image quality can be improved.

Although first and second patterns by scanning are used alternately in the aforementioned color-mode printing method, the present invention is not limited thereto. For example, configuration may be made so that data corresponding to a half of the printing width of each color and data corresponding to the remaining half are printed in first and second patterns, respectively.

Further, in the black mode, unidirectional printing may be made continuously without use of bidirectional printing. In the color mode, both bidirectional printing and unidirectional printing can be used.

Further, in the case where the number of lines in which printing only in black can be made is not larger than the number of lines corresponding to the printing width of each color in the color head in the black mode, the configuration may be designed so that printing is performed after the black mode is switched over to the color mode at that point of time in the same manner as in the aforementioned first embodiment to thereby perform printing efficiently.

Next, the operation of skipping a line having no image data to be printed will be described. In the black mode, for example, a line having no image data to be printed is generated in a space between lines, or the like. In the aforementioned second embodiment, such a line is detected and the printing region is divided by the detected line. When there is such a line having no image data to be printed, only paper feeding can be performed without performing printing scanning for such a line. Assuming that pre-reading is performed, for example, from the state represented by (1) in FIG. 5, then the line b is a line having no image data to be printed. Therefore, the number of lines in a region of from the line b to a line just before the line in which there is some image data to be printed is counted so that paper feeding is performed by the count value.

Figure 7:
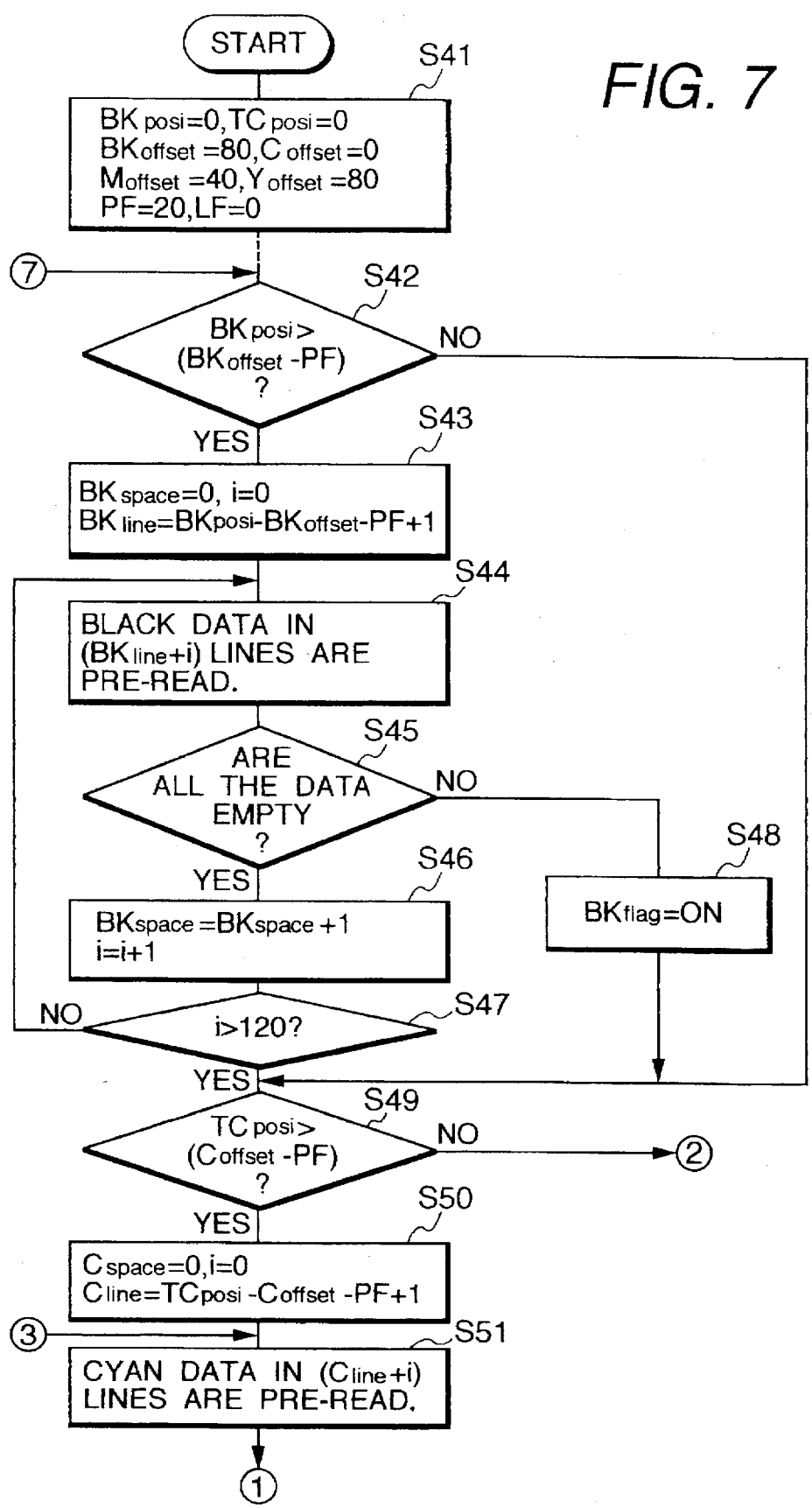
FIG. 7 is a flow chart showing an example of the line skipping operation in the color mode in the second embodiment of the present invention.
Figure 8:
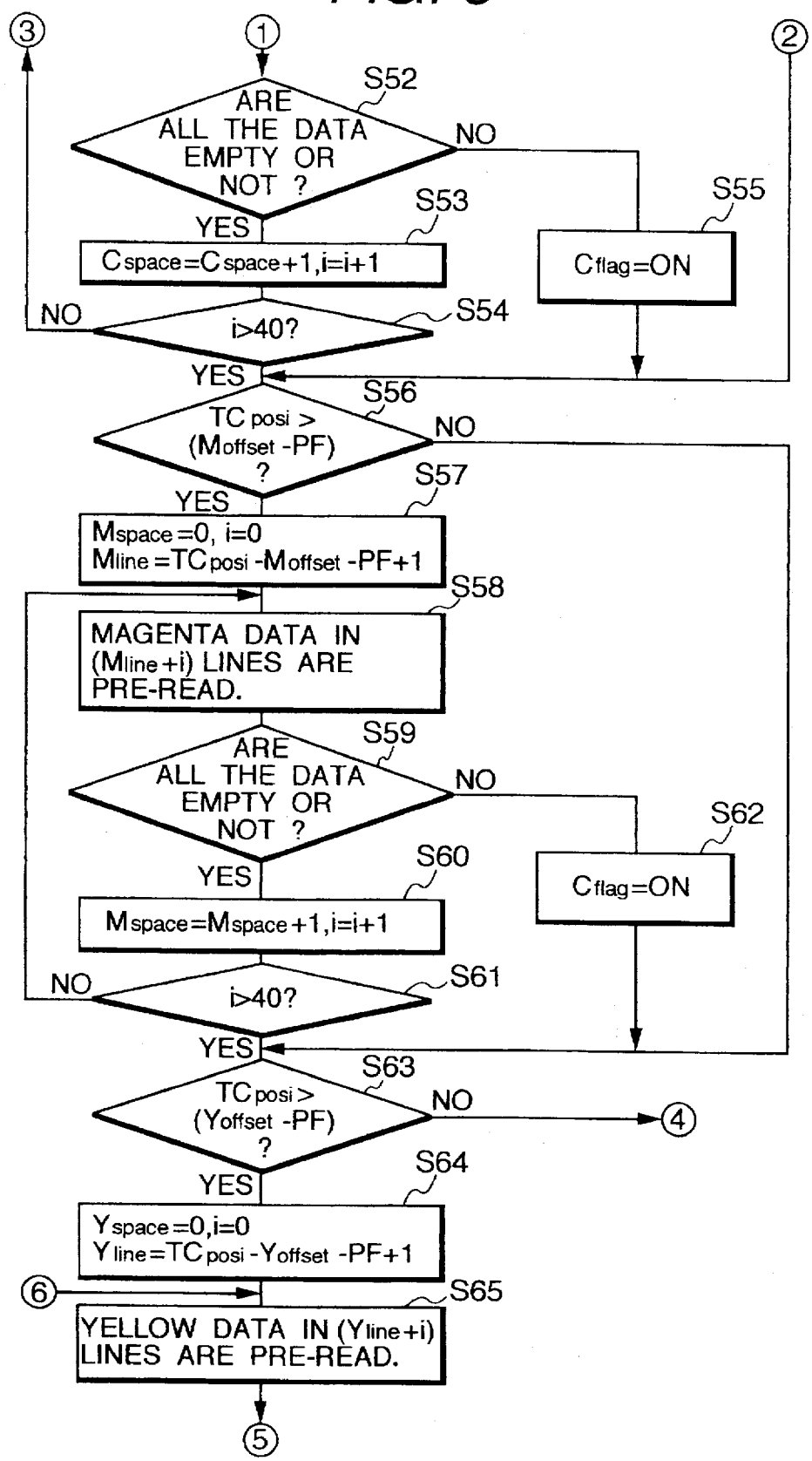
FIG. 8 is a flow chart (continued) showing an example of the line skipping operation in the color mode in the second embodiment of the present invention.
Figure 9:
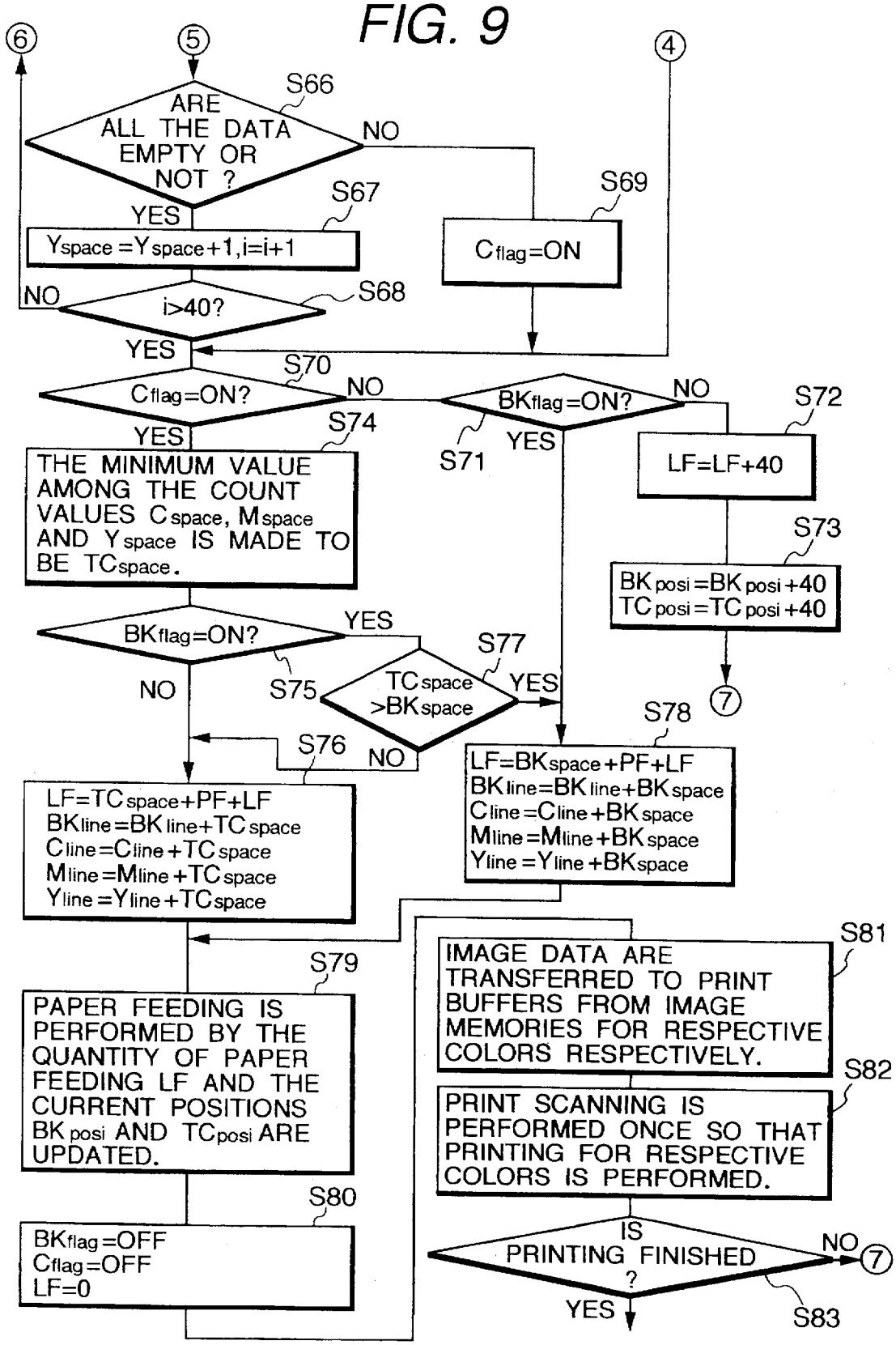
FIG. 9 is a flow chart (continued) showing an example of the line skipping operation in the color mode in the second embodiment of the present invention.

FIGS. 7 to 9 are flow charts showing an example of the line-skipping operation in the color mode in the second embodiment of the present invention. In the color mode, when there is no image data to be printed in a printing region set for each color, for example, as represented by (6) in FIG. 5, line skipping can be performed until some image data to be printed appears. In this case, image data of respective colors in the same position are not referred to as described above in the black mode but image data in printing regions set for respective colors are referred to. In this example, it is assumed that the printing width of the black head is 120 dots and that black data are printed in the same region as yellow. It is further assumed that the printing width of each color in the color head is 40 dots. The variables BKposi and TCposi indicate the current position of the black head and the current position of the color head respectively, and the constants BKoffset, Coffset, Moffset and Yoffset indicate the number of meshes in the nozzle for the respective colors in the color head (the number of dots showing the distance from the cyan side in the drawing). Further, the constant PF is a value which indicates the quantity of ordinary paper feeding and which exhibits a half of the printing width of each color in the color head. The variable LF indicates a quantity of actual paper feeding.

In S41, initialization is performed. Then, in S42, a judgment is made as to whether the current position BKposi of the black head is larger than the value (BKoffset–PF). If the current position BKposi is not larger than the value (BKoffset–PE), the situation of the routine goes to S49. In S43, a counter BKspace for indicating the number of blank lines for black is set to 0, a counter BKline for indicating the black data reference line is set to the value (BKposi–BKoffset–PF+1), and a loop counter i is set to 0. In S44, black data in (BKline+i) lines are pre-read. In S45, a judgment is made as to whether all the data are empty, that is, as to whether there is no data to be printed. If all the data are empty, the counter BKspace and the loop counter i are counted up in S46 and a judgment is made in S47 as to whether reference to 120 lines is finished or not. If the reference to 120 lines is not finished, the situation of the routine goes back to S44 and the aforementioned operation is repeated.

If some not-empty line is detected in S45, the BKflag indicating the detection of the not-empty line is turned on in S48 and the situation of the routine goes out of the loop to S49. Also in the case where the reference to 120 lines is finished in S47, the situation of the routine goes to S49. This case shows that all the 120 lines are empty.

Then, cyan data are processed in the same manner as black data. In S49, a judgment is made as to whether the current position TCposi of the color head is larger than the value (Coffset–PF). If the current position TCposi is not larger than the value (Coffset–PF), the situation of the routine goes to S56. In S50, a counter Cspace for indicating the number of blank lines for cyan is set to 0, a counter Cline for indicating the cyan data reference line is set to the value (Cposi–Coffset–PF+1), and a loop counter i is set to 0. In S51, cyan data in (Cline+i) lines are pre-read. In S52, a judgment is made as to whether all the data are empty or not. If all the data are empty, the counter Cspace and the loop counter i are counted up in S53 and a judgment is made in S54 as to whether reference to 40 lines is finished or not. If the reference to 40 lines is not finished, the situation of the routine goes back to S51 and the aforementioned operation is repeated.

If some not-empty line is detected in S52, the Cflag for indicating the detection of the not-empty line is turned on in S55 and the situation of the routine goes out of the loop to S56. Also in the case where the reference to 40 lines is finished in S54, the situation of the routine goes to S56.

In S56 to S62, magenta data are processed in the same manner as in S49 to S55 for cyan. In this occasion, the Mline for indicating the magenta data reference line is set to the value (Mposi–Moffset–PF+1). Further, in S63 to S69, yellow data are processed in the same manner as described above. In this occasion, the Yline for indicating the yellow data reference line is set to the value (Yposi–Yoffset–PF+1). As described above, the number of empty lines for each color is counted. When there is some not-empty line, the Cflag is turned on.

In S70, a judgment is made as to whether the Cflag is turned on or not. If the Cflag is not turned on, a judgment is further made in S71 as to whether the BKflag is turned on or not. If BKflag is not turned on, there is shown the fact that both color data and black data are both absent. In this case, because paper feeding can be performed more greatly, the quantity of paper feeding is increased by 40 dots in S72, the current positions BKposi and TCposi are updated in S73, and the situation of the routine goes back to S42 in which empty lines are further counted.

When Cflag is turned on in S70, some data to be printed is present in 40 lines for each color. Accordingly, in S74, the minimum value among the count values Cspace, Mspace and Yspace is made to be TCspace. In S75, a judgment is further made as to whether the BKflag is turned on or not. When the BKflag is not turned on, there is shown the fact that only color data are detected. In S76, the quantity LF of paper feeding is set to the value (TCspace+PF+LF) and TCspace is added to BKline, Cline, Mline and Yline, respectively.

When the BKflag is turned on in S75, there is shown the fact that both the black and color data are detected. In S77, the minimum number of empty lines TCspace detected from color data is compared with the number of empty lines BKspace detected from black data, so that when TCspace is smaller than BKspace, TCspace is employed. In S76, setting of the quantity of paper feeding LF and re-setting of the reference line are performed by using TCspace. When BKspace is smaller than TCspace, the quantity of paper feeding LF is set to the value (BKspace+PF+LF) and BKspace is added to BKline, Cline, Mline and Yline, respectively in S78.

Further, when BKflag is turned on in S71, the detection of black data is shown. Accordingly, the situation of the routine goes to S78 in which setting of the quantity LF of paper feeding and re-setting of the reference line are performed by using the number of lines BKspace having empty black data.

When setting of the quantity of paper feeding LF and re-setting of the reference line are performed in S76 or S78 as described above, paper feeding is performed by the quantity of paper feeding LF in S79 and the current positions BKposi and TCposi are updated. Further, in S80, the BEflag and Cflag are turned off and the quantity of paper feeding LF is reset to 0. Then, in S81, image data corresponding to 40 lines from BKline with respect to black data, image data corresponding to 40 lines from Cline with respect to cyan data, image data corresponding to 40 lines from Mline with respect to magenta data and image data corresponding to 40 lines from Yline with respect to yellow data are transferred to print buffers from image memories for respective colors respectively. In this occasion, because BKline, Cline, Mline and Yline are calculated on the basis of respective offset values, that is, BKoffset, Coffset, Moffset and Yoffset respectively, image data corresponding to respective printing regions are transferred. After transfer, in S82, print scanning is performed once so that printing for respective colors is performed.

In S83, a judgment is made as to whether printing is finished. If printing is not finished, the situation of the routine goes back to S42 in which printing process in the color mode is continued. If printing is finished, a print terminating operation is carried out.

As described above, the skipping process in the color mode is carried out. By such a skipping process, unnecessary print scanning can be avoided to achieve high-speed printing even in the color mode.

In the operation in the aforementioned embodiments, there is some case where paper feeding cannot but be performed by several lines actually. When, for example, data corresponding to the printing width of the black head are pre-read in the black mode and there is some color data contained in the pre-read data, there is some case where the black head cannot be positioned in a line just before the color data. Further, when paper feeding is performed as described above, there is some case where paper feeding by the counted number of dots cannot be made. In such a case, the number of lines by which paper feeding can be made may be considered so that data up to the paper-feed allowed line nearest to the color data are printed in the black mode, or the maximum quantity of paper feeding is set and performed within the number of counted empty lines.

Further, when such paper feeding cannot but be performed by several dots, there is, for example, some case where the number of dots provided in the black head is not matched with the quantity of paper feeding. In such a case, control can be made so that the number of dots corresponding to the quantity of paper feeding is used without use of part of the black head. Alternatively, in order to cope with such a situation, control may be made so that the nozzle used is changed correspondingly to print scanning. The same rule applies to dots of each color in the color head.

The aforementioned print control can be employed in various types of serial printers such as ink-jet type printers, dot-impact type printers, thermal transfer type printers, and so on. Particularly in the case of ink-jet type printers, there is some case where mixing of colors occurs between adjacent colors in the color head. In order to avoid such a problem, a technique for providing a distance of several dots (dummy nozzle) between respective colors to thereby prevent mixing of colors has been developed. In the case where such a dummy nozzle is provided, it is necessary that the aforementioned respective control is performed taking the dummy nozzle into consideration.

As obvious from the above description, according to the present invention, high-speed printing can be made in a two-head type printer because data in a region containing black data singly are printed by using a black head having a printing width as large as possible. There is a further effect that higher-speed printing can be achieved by performing a skipping operation when some line having no data to be printed commonly to the respective colors is present, or some line having no data to be printed is present in a printing region for each color.

What is claimed is:

1. A printing control method for a serial printer, the serial printer having:

a color print head and a black print head arranged in a main scanning direction on a carriage, said color print head and said black print head each having an array of printing elements arranged in a subsidiary scanning direction, wherein each array of printing elements comprises a plurality of nozzles, said array of printing elements in said color print head divided into groups of printing elements by color, a height of said printing element array in said black print head being higher than a height of said printing element array in any of said color groups in said color print head, said color print head and said black print head driven based on the color of said image data read from an image memory, wherein said method has a recording mode in which:
   said image data on a number of lines which corresponds to the height of said printing element array in said black print head is read from said image memory;

when color image data is included in the read image data, a number N1 of lines in a region from the leading line in the read image data to a line just before a presence of a first color image data is detected and compared with a number N2 of lines corresponding to the height of each of said color groups in said color print head;

when N1>N2, said image data of the number N1 of lines from the leading line of said read image data is printed by driving said black print head; and when N1≦N2, said image data of the number N2 of lines from the leading line of said read image data is printed by driving said color print head and said black print head.

2. The printing control method of claim 1,
   wherein said color print head has at least one group of printing elements for printing cyan; and
   when said color print head and said black print head are used for performing printing, black printing is performed by using a printing element located in said black print head at a position corresponding to a cyan printing element in said color print head.

3. The printing control method of claim 1,
   wherein when said color print head is driven to perform printing, image data in a plurality of lines corresponding to the arrangement of each color group in said color print head is read from said image memory.

4. The printing control method of claim 1, wherein, when image data is read from said image memory, a line skipping operation is performed, the number of lines skipped based on the number of lines from the leading line of said read image data to a line just before the line in which said black image data or said color image data is present, and then image data is read again from said image memory.

5. The printing control method according to claim 1, wherein, when image data for printing is read from said image memory:

image data is read for every image region to be printed for every color;

a number N3 of lines in a region from the leading line of said read image data to a line just before the line containing the first black image data and a number N4 of lines in a region from the leading line of said read image data to a line just before the line containing a first color image data is detected;

a minimum number N5 of lines is detected in the number N3 of lines and the number N4 of lines;

the recording medium is advanced by the number N5 of lines; and image data for each color is read from a line advanced by the number N5 of lines from the leading line of said read image data.

6. A printing control method for a serial printer, the serial printer having:

a color print head and a black print head arranged in a main scanning direction on a carriage, said color print head and said black print head each having an array of printing elements arranged in a subsidiary scanning direction, wherein each array of printing elements comprises a plurality of nozzles, said array of printing elements in said color print head divided into groups of printing elements by color, a height of said printing element array in said black print head being higher than a height of said printing element array in any of said color groups in said color print head, said color print head and said black print head driven based on the color of said image data read from an image memory, wherein said method has a recording mode in which:

said image data on a number of lines which corresponds to the height of said printing element array in said black print head is read from said image memory;

when color image data is included in the read image data, said read image data is printed by driving a portion of said printing element array of said black print head corresponding to the number of lines in a region from the leading line in the read image data to a line just before a presence of the first color image data; and when color data is not included in the read image data, said read image data is printed by driving all of the printing element array of said black print head.

7. The printing control method of claim 6, wherein said color print head has at least one group of printing elements for printing cyan; and when said color print head and said black print head are used for performing printing, black printing is performed by using a printing element located in said black print head at a position corresponding to a cyan printing element in said color print head.

8. The printing control method of claim 6, wherein when said color print head is driven to perform printing, image data in a plurality of lines corresponding to the arrangement of each color group in said color print head is read from said image memory.

9. The printing control method of claim 6, wherein, when image data is read from said image memory, a line skipping operation is performed, the number of lines skipped based on the number of lines from the leading line of said read image data to a line just before the line in which said black image data or said color image data is present, and then image data is read again from said image memory.

10. A printing control method for a serial printer, the serial printer having:

a color print head and a black print head arranged in a main scanning direction on a carriage, said color print head and said black head each having an array of printing elements arranged in a subsidiary scanning direction, wherein each array of printing elements comprises a plurality of nozzles, said array of printing elements in said color print head divided into groups of printing elements by color, a height of said printing element array in said black print head being higher than a height of said printing element array in any of said color groups in said color print head, said color print head and said black print head driven based on the color of said image data read from an image memory, wherein said method has a recording mode in which:

said image data on a number of lines which corresponds to the height of said printing element array of one color group in said color print head is read from said image memory;

when color data is not included in the read image data, image data is further read out up to a number of lines corresponding to the height of said printing element array in said black print head;

when only color data is included in the read image data, the number of lines of said read image data corresponding to the height of said printing element array of one color group in said color print head is printed by driving only the color print head; and when color data is included in the read image data, the number of lines of said read image data corresponding to the height of said printing element array of one color group in said color print head is printed by driving said color print head and said black print head and then said image data is printed by driving only said black print head.

11. The printing control method of claim 10, wherein said color print head has at least one group of printing elements for printing cyan; and when said color print head and said black print head are used for performing printing, black printing is performed by using a printing element located in said black print head at a position corresponding to a cyan printing element in said color print head.

12. The printing control method of claim 10, wherein when said color print head is driven to perform printing, image data in a plurality of lines corresponding to the arrangement of each color group in said color print head is read from said image memory.

13. The printing control method of claim 10, wherein, when image data is read from said image memory, a line skipping operation is performed, the number of lines skipped based on the number of lines from the leading line of said read image data to a line just before the line in which said black image data or said color image data is present, and then image data is read again from said image memory.

14. A printing control apparatus for a serial printer comprising:

a color print head; and a black print head arranged in a main scanning direction on carriage, said color print head and said black print head each having an array of printing elements arranged in a subsidiary scanning direction, wherein each array of printing elements comprises a plurality of nozzles, said array of printing elements in said color print head divided into groups of printing elements by color, a height of said printing element array in said black print head being higher than a height of said printing element array in any of said color groups in said color print head, said color print head and said black print head driven based on the color of said image data read from an image memory, wherein said apparatus has a recording mode in which:

said image data on a number of lines which corresponds to the height of said printing element array in said black print head is read from said image memory;

when color image data is included in the read image data, a number N1 of lines in a region from the leading line in the read image data to a line just before the presence of a first color image data is detected and compared with a number N2 of lines corresponding to the height of each of said color groups in said color print head;

when N1>N2, said image data of the number N1 of lines from the leading line of said read image data is printed by driving said black print head; and when N1<N2, said image data of the number N2 of lines from the leading line of said read image data is printed by driving said color print head and said black print head.

15. The printing control apparatus of claim 14, wherein:

said color print head has at least one group of printing elements for printing cyan; and when said color print head and said black print head are used for performing printing, black printing is performed by using a printing element located in said black print head at a position corresponding to a cyan printing element in said color print head.

16. The printing control apparatus of claim 14, wherein when said color print head is driven to perform printing, image data in a plurality of lines corresponding to the arrangement of each color group in said color print head is read from said image memory.

17. The printing control apparatus of claim 14, wherein, when image data is read from said image memory, a line skipping operation is performed, the number of lines skipped based on the number of lines from the leading line of said read image data to a line just before the line in which said black image data or said color image data is present, and then image data is read again from said image memory.

18. The printing control apparatus according to claim 14, wherein, when image data for printing is read from said image memory:

image data is read for every image region to be printed for every color;

a number N3 of lines in a region from the leading line of said read image data to a line just before the line containing the first black image data and a number N4 of lines in a region from the leading line of said read image data to a line just before the line containing a first color image data is detected;

a minimum number N5 of lines is detected in the number N3 of lines and the number N4 of lines;

the recording medium is advanced by the number N5 of lines; and image data for each color is read from a line advanced by the number N5 of lines from the leading line of said read image data.

19. A printing control apparatus for a serial printer comprising:

a color print head and a black print head arranged in a main scanning direction on a carriage, said color print head and said black print head each having an array of printing elements arranged in a subsidiary scanning direction, wherein each array of printing elements comprises a plurality of nozzles, said array of printing elements in said color print head divided into groups of printing elements by color, a height of said printing element array in said black print head being higher than a height of said printing element array in any of said color groups in said color print head, said color print head and said black print head driven based on the color of said image data read from an image memory, wherein said apparatus has a recording mode in which:

said image data on a number of lines which corresponds to the height of said printing element array in said black print head is read from said image memory;

when color image data is included in the read image data, said read image data is printed by driving a portion of said printing element array of said black print head corresponding to the number of lines in a region from the leading line in the read image data to a line just before a presence of the first color image data; and when color data is not included in the read image data, said read image data is printed by driving all of the printing element array of said black print head.

20. The printing control apparatus of claim 19, wherein:

said color print head has at least one group of printing elements for printing cyan; and when said color print head and said black print head are used for performing printing, black printing is performed by using a printing element located in said black print head at a position corresponding to a cyan printing element in said color print head.

21. The printing control apparatus of claim 19, wherein when said color print head is driven to perform printing, image data in a plurality of lines corresponding to the arrangement of each color group in said color print heat is read from said image memory.

22. The printing control apparatus of claim 19, wherein, when image data is read from said image memory, a line skipping operation is performed, the number of lines skipped based on the number of lines from the leading line of said read image data to a line just before the line in which said black image data or said color image data is present, and then image data is read again from said image memory.

23. A printing control apparatus for a serial printer comprising:

a color print head and a black print head arranged in a main scanning direction on a carriage, said color print head and said black print head each having an array of printing elements arranged in a subsidiary scanning direction, wherein each array of printing elements comprises a plurality of nozzles, said array of printing elements in said color print head divided into groups of printing elements by color, a height of said printing element array in said black print head being higher than a height of said printing element array in any of said color groups in said color print head, said color print head and said black print head driven based on the color of said image data read from an image memory, wherein said apparatus has a recording mode in which:
said image data on a number of lines which corresponds to the height of said printing element array of one color group in said color print head is read from said image memory;

when color data is not included in the read image data, image data is further read out up to a number of lines corresponding to the height of said printing element array in said black print head;

when only color data is included in the read image data, the number of lines of said read image data corresponding to the height of said printing element array of one color group in said color print head is printed by driving only the color print head; and when color data is included in the read image data, the number of lines of said read image data corresponding to the height of said printing element array of one color group in said color print head is printed by driving said color print head and said black print head and then said image data is printed by driving only said black print head.

24. The printing control apparatus of claim 23, wherein:

said color print head has at least one group of printing elements for printing cyan; and when said color print head and said black print head are used for performing printing, black printing is performed by using a printing element located in said black print head at a position corresponding to a cyan printing element in said color print head.

25. The printing control apparatus of claim 23, wherein when said color print head is driven to perform printing, image data in a plurality of lines corresponding to the arrangement of each color group in said color print head is read from said image memory.

26. The printing control apparatus of claim 23, wherein, when image data is read from said image memory, a line skipping operation is performed, the number of lines skipped based on the number of lines from the leading line of said read image data to a line just before the line in which said black image data or said color image data is present, and then image data is read again from said image memory.

* * * * *